No. 760,305. PATENTED MAY 17, 1904.
R. G. CASTILLO.
COUPLING FOR ELECTRIC WIRES.
APPLICATION FILED SEPT. 9, 1903.
NO MODEL.
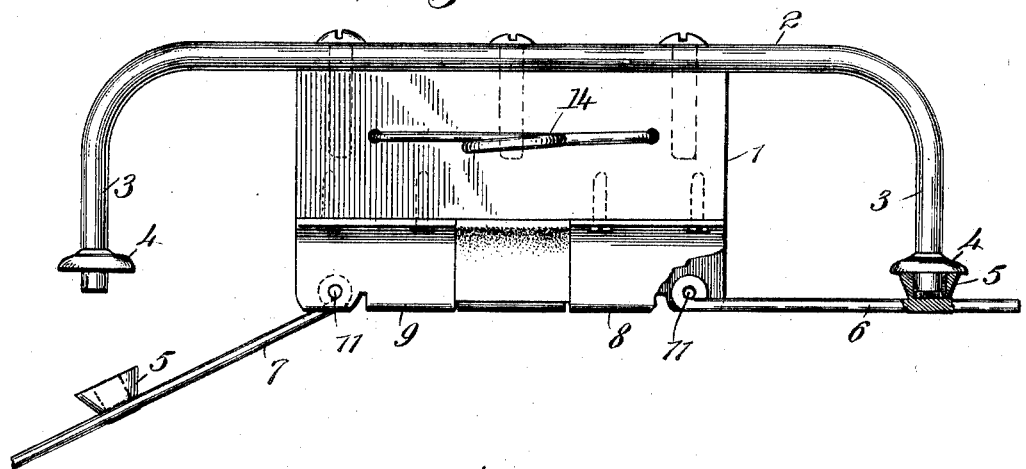
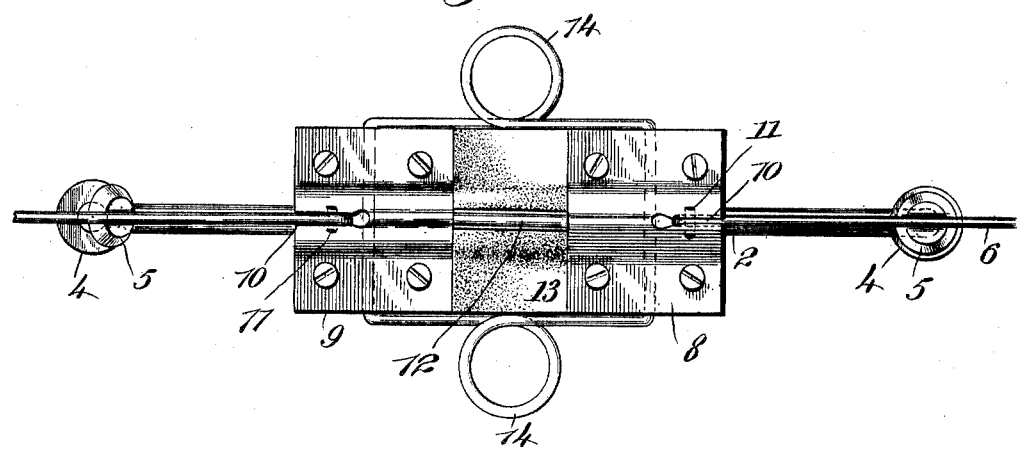
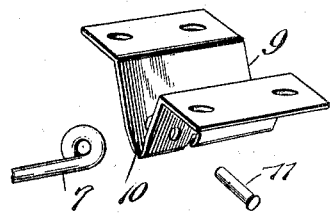
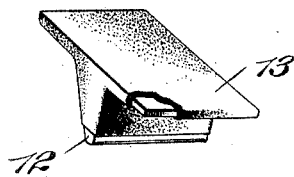
WITNESSES:
E. P. Kingsbury
C. R. Ferguson
INVENTOR
Ricardo Garibay Castillo
BY
Munn
ATTORNEYS No. 760,305. Patented May 17, 1904.

UNITED STATES PATENT OFFICE.

RICARDO GARIBAY CASTILLO, OF MEXICO, MEXICO.

COUPLING FOR ELECTRIC WIRES.

SPECIFICATION forming part of Letters Patent No. 760,305, dated May 17, 1904.

Application filed September 9, 1903. Serial No. 172,462. (No model.)

*To all whom it may concern:*

Be it known that I, RICARDO GARIBAY CASTILLO, a citizen of the Republic of Mexico, and a resident of the city of Mexico, Mexico, have invented a new and Improved Coupling for Electric Wires, of which the following is a full, clear, and exact description.

This invention relates particularly to improvements in couplings for trolley-wires of electric railways, an object being to provide a coupling of simple construction and so arranged that should a trolley-wire break and its end fall to the ground the fallen section will be wholly cut out of electric connection, and thus prevent the possibility of accident from an electric current.

I will describe a coupling for electric wires embodying my invention and then point out the novel features in the appended claims.

Reference is to be had to the accompanying drawings, forming a part of this specification, in which similar characters of reference indicate corresponding parts in all the figures.

Figure 1 is a side elevation of a coupling for electric wires embodying my invention. Fig. 2 is a bottom plan view thereof. Fig. 3 is a perspective view of one of the coupling-clips employed, and Fig. 4 is a perspective view of an insulating-block employed.

The coupling comprises a block 1, of insulating material—such, for instance, as hard wood—and attached to the upper end of this block by means of screws or otherwise is the conductor 2, consisting of wire which, it may be here stated, is of somewhat larger gage than that of the trolley-wire. The ends of this wire conductor 2 are turned downward, as indicated at 3, and just above the extreme ends collars 4 are secured to the wire, these collars, like the wire, being of copper. The collars form covers for cups 5, attached to the trolley-wires 6 7, the said cups being designed to contain mercury, iron filings, or other good conductive material, and into the material contained in the cups the ends of the wire conductor 2 extend. By this arrangement a perfect connection is made between the two ends of the trolley-wire, and therefore there will be no diminishing of the current, as is sometimes the case when the two ends of a wire are otherwise connected. The ends of the wires 6 7 are connected to metal clips 8 9, secured to the under side of the block 1 and spaced apart. These clips are shown as substantially V-shaped in cross-section, so that their lower portions will be but slightly greater in area than the trolley-wire, thus permitting the trolley to freely pass over the same.

The couplings at the outer ends and at the bottom are slotted, as indicated at 10, so as to permit a section of wire to drop down should the wire be broken. Pins 11 pass through openings in the opposite side walls of the clips and through eyes formed in the ends of the trolley-wire, as clearly indicated in Fig. 1. To prevent any possible electric connection between the clips or between the ends of the wires connected therewith, I employ a block 12, of wood or the like, which is arranged between adjacent ends of the clips 8 9 and secured to the block 1. This block may consist of wood, and its upper portion, or the part above that designed to be engaged by the trolley-wheel, may have a covering 13, of rubber or similar material.

On the opposite sides of the block 1 are loops 14, in which suspending-cables or the like are designed to extend to posts or other supports.

When the several parts are in normal position, it is obvious that the current will pass from the section of wire 2 and thence to the wires 6 and 7. The collars 4, serving as covers for the cups 5, will prevent the discharge of quicksilver or other material contained in the cups. Should the wire break, the mercury contacts will offer no obstruction to the quick falling of the wire, and of course when the connection is broken between the fallen section and the coupling-wire 3 there will be no danger from the fallen wire.

Having thus described my invention, I claim as new and desire to secure by Letters Patent—

1. A coupling for electric wires, comprising a block of insulating material, a coupling-wire secured to said block, conductor-wires attached to the block, and mercury-cups carried by the conductor-wires for receiving said coupling-wire.

2. A coupling for electric wires, comprising a block of insulating material, a coupling-wire attached to said block and having downwardly-turned ends, conductor-wires, mercury-cups carried by the conductor-wires and into which said downwardly-turned ends are designed to project, collars upon said downwardly-turned ends forming covers for the cups, and clips on the block with which the ends of the conductor-wires connect.

3. A coupling for electric wires, comprising a block of insulating material, a coupling-wire attached to said block and having downwardly-turned ends, collars arranged on the downwardly-turned portions slightly above the extremities, conductor-wires having their ends connected to the block but spaced apart, and mercury-cups carried by said wires for receiving the ends of the coupling-wire.

4. A coupling for electric wires comprising a block of insulating material, metal clips secured to the lower side of said block, said clips being substantially V-shaped in cross-section and spaced apart, conductor-wires connected to the clips, a block of insulating material secured between the clips, a coupling-wire attached to the block and having downwardly-turned ends, and means for electrically connecting the ends of said coupling-wire to the conductor-wires.

5. A coupling for electric wires, comprising a block of insulating material, metal clips secured to the lower side of said block, said clips being substantially V-shaped in cross-section and spaced apart, a block of insulating material secured between the clips, conductor-wires secured to said clips, a coupling-wire attached to the block and having downwardly-turned ends, and means for separably connecting the ends of said coupling-wire to the conductor-wires.

In testimony whereof I have signed my name to this specification in the presence of two subscribing witnesses.

RICARDO GARIBAY CASTILLO.

Witnesses:
ALFREDO S. SICILIA,
A. W. GOBRECHT.